United States Patent [19]

Hartless et al.

[11] 3,970,637

[45] July 20, 1976

[54] STABILIZED POLYMERIC COMPOSITION AND PRODUCT USING SAME

[75] Inventors: Ray Lawson Hartless, Lopatcong Township, Warren County; Anthony Marion Trozzolo, Murray Hill, both of N.J.

[73] Assignee: Bell Telephone Laboratories, Incorporated, Murray Hill, N.J.

[22] Filed: Aug. 27, 1974

[21] Appl. No.: 500,958

[52] U.S. Cl.................. 260/45.9 NC; 260/45.85 B; 260/45.95 R; 428/461
[51] Int. Cl.² ........................................... C08J 3/20
[58] Field of Search ............ 260/45.9 NC, 45.95 R, 260/45.85 B; 428/461

[56] References Cited
UNITED STATES PATENTS

| | | | |
|---|---|---|---|
| 3,357,944 | 12/1967 | Dexter.......................... | 260/45.9 NC |
| 3,440,210 | 4/1969 | Blount et al................. | 260/45.9 NC |

*Primary Examiner*—V.P. Hoke
*Attorney, Agent, or Firm*—G. S. Indig

[57] ABSTRACT

The condensation product of oxalyl dihydrazide and a mono-ortho-hydroxy aryl ketone is found to be an effective metal deactivator in saturated hydrocarbon polymers. The stabilizer is usefully incorporated in primary insulation, for example in polyethylene insulation on copper wire.

7 Claims, No Drawings

STABILIZED POLYMERIC COMPOSITION AND PRODUCT USING SAME

BACKGROUND OF THE INVENTION

1. Field of the Invention

The invention is concerned with the stabilization of essentially saturated hydrocarbon polymeric materials against oxidative degradation and is particularly concerned with such stabilization under circumstances that the polymer is in intimate contact with copper or other metals known to accelerate the oxidative degradative process.

2. Description of the Prior Art

It is well recognized that saturated hydrocarbon polymeric compositions degrade under the influence of oxygen. This degradation which involves mechanical as well as electrical properties increases with increasing temperature and is, accordingly, known as thermal degradation. It is also well known that the degradative process is accelerated by the presence of copper and certain other active metals. The degradative process is believed initiated at the sites of tertiary carbon atoms on the polymer chain and, accordingly, is more pronounced, for example, in polypropylene which, by its nature, contains a tertiary carbon for every two carbons in the main chain, than in polyethylene which may contain only from 1/50 to 1/1000 tertiary carbons expressed as a fraction of the total number of carbon atoms in the polymer chain.

The thermal oxidative degradation process in polyolefins is considered to be autocatalytic, proceeding from the production of free radicals resulting from hydroperoxide production. Catalysis of the degradative process by copper or other metal ions is thought to proceed by the formation of unstable coordination complexes which facilitate free radical production.

Thermal degradative effects are minimized in such compositions generally by any of a class of hindered phenols or aryl amines which combine with free radicals to act as chain terminators. A large variety of such "thermal antioxidants" are commercially available and any of several provide adequate protection for many uses. Nevertheless, there is some continuing effort to develop new antioxidants, sometimes for economic reasons, sometimes to minimize effect on certain polymer properties, and, always, to still further extend lifetime.

An area of some continued activity concerns well engineered, long life expectancy polymeric products which are necessarily maintained in contact with copper or other active metals known to accelerate degradation. Perhaps the most prevalent category is that of primary insulation on copper wire (although similar effects are seen to a lesser extent where copper is replaced by other conductive metals, such as, aluminum). The effect of copper is lessened by any of several metal deactivators which somehow chemically combine with the metal ions. Oxamide, as well as some of its derivatives, accomplishes this end and has been used successfully in polymers including polypropylene and polyethylene. See 5, *Polymer Engineering and Science* 3 (1965). Another class of metal inhibitors is made up of the reaction products of an orthohydroxy aromatic carbonyl compound with an alkyl diamine. A more recently developed class of compounds, now in prevalent use in polyethylene, includes the reaction product of benzaldehyde and oxalyl dihydrazide. Such compounds, as represented by N,N'-dibenzal (oxalyl dihydrazide), are now in widespread use in polyethylene and ethylene propylene primary insulation. See U.S. Pat. No. 3,440,210. In general, where particularly long life is required, such protected compositions contain both a metal deactivator and a conventional thermal antioxidant.

SUMMARY OF THE INVENTION

Members of a class of compounds effectively deactivate copper and other active metals which accelerate the oxidative degradation of polyethylene and other polyolefins. These stabilizers contain both the functional groups of oxamide and prior known orthohydroxy aromatic carbonyl compounds. See 5, *Polymer Engineering and Science* 3 (1965) and W. L. Hawkins *Polymer Stabilization*, Chapter 2, Wiley — Interscience, New York, 1972, respectively. Included compounds are also chemically related to N,N'-dibenze (oxalyl dihydrazide) a prevalent metal deactivator. See U.S. Pat. No. 3,440,210. While variants are possible and are described in the detailed description, compounds of the invention differ from that of the cited U.S. Pat. No. 3,440,210 inter alia in the presence of a single hydroxyl substituent in a 2-position on the ring moieties. It will be seen from the examples that the inventive compounds are effective metal deactivators. Some effectiveness is retained as polyolefin stabilizers in the absence of copper or other active metal but it is believed the conventional stabilization function will be served by an alternative supplemental thermal antioxidant such, for example, as a compound of copending application Ser. No. 500,957, filed Aug. 27, 1974 or a conventional hindered phenol.

Compounds of the invention may be prepared by condensation of a 2-hydroxy aryl ketone with oxalyl dihydrazide. While variations are not generally advantageous in the second reactant, a variety of modifications are permitted in the first. So, for example, a variety of cyclic substituents are permitted. Improved metal deactivation activity is experimentally established as due to the ortho-hyroxy grouping. Inclusion of a second ortho-hydroxy grouping (2-, 6-) while resulting in a product of stabilization effectiveness, slightly impairs the effectiveness of the mono-hydroxy material. Condensation with a ketone results in a product which is essentially indistinguishable from that resulting from a condensation from an aldehyde. Interestingly, the ketone condensation product without the ortho-hydroxy substituent is less effective than the related non-hydroxylated aldehyde condensation product of U.S. Pat. No. 3,440,210.

DETAILED DESCRIPTION

1. Composition
A. Novel Stabilizer

Compositions of the invention may be represented by the structural formula:

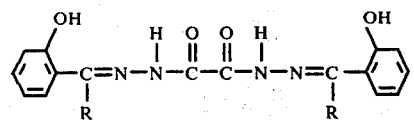

in which R is a methyl or a higher homologue of the alkyl series.

While the formula depicts a one substituent single ring moiety, a variety of substituents as well as fused rings are permitted, the one requirement being that there be a hydroxyl substituent and but a single hydroxyl substituent on any ring moiety ortho to the carbonyl grouping. Permitted modifications include any additional substituent at any other ring position. Such substituents are generally alkyl and may be included to improve compatibility with the polymer or even to sterically hinder the hydroxyl. Other groupings such as alkoxy and halogen may replace the alkyl. Certain substituents known to impair activity of hydroxyl substituents, such as nitro, nitroso and COOH, etc. are to be avoided. Such considerations are common in antioxidant chemistry where they must be taken into account in designing appropriate hindered phenolic antioxidants. The above considerations are taken into account in more generally specifying compositions of the invention by the following structural formula:

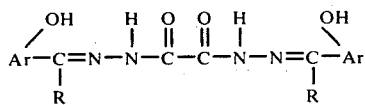

where the symbol Ar is used to denote a single or fused ring moiety. The structure explicitly provides for the one required ring substituent, i.e., the hydroxy substituent which is necessarily ortho to the carbonyl grouping. Other provisions inter alia, that there be no other ortho hydroxy grouping as well as permitted and prohibited substituents are otherwise set forth above.

Compounds of the invention are produced by condensation of oxalyl dihydrazide with the appropriate 2-hydroxyl aryl ketone.

B. The Polymer

Polymeric compositions beneficially stabilized in accordance with the invention are nominally ethylenically saturated. They may be homopolymers, such as, polyethylene, polypropylene, poly-butene-1 etc; they may be copolymers, such as, poly (ethylene-propylene). From the thermal oxidative standpoint, it is now well established that a region of susceptibility in the polymer is that containing a tertiary carbon atom. First attack may also involve an occasional (nominally absent) ethylenic unsaturation as well as certain impurities, such as, residual catalyst originally introduced to bring about polymerization (particularly in high density Ziegler-type polymers).

While discussion is generally in terms of prototypical polyolefins, whether homopolymers or copolymers, in fact, commercial products are generally somewhat more complex and may contain up to ten percent by weight of other, generally hydrocarbon constituents, as part of the polymers or in a mixture exclusive of filler. Commercial examples of such products, all adequately protected in accordance with the invention, are the polymerization products of monomers, such as, ethylene or propylene together with vinyl acetate, acrylic acid, methacrylic acid, and/or esters of acrylic acids.

C. Other Ingredients

A variety of other ingredients are conventionally included in commercial polymeric products of the type contemplated. These include lubricants, fillers, pigments, and other colorants, etc. Under certain circumstances, pigmentation may be designed to afford protection from ultraviolet attack although, in general, stabilizers of the invention are contemplated primarily for use in primary insulation which, in most structures, is protected from ultraviolet attack by outer sheathing.

D. Other Considerations

Stabilizers of the invention show remarkable improvement as metal deactivators as compared with related compounds of U.S. Pat. No. 3,357,944. Specifically a compound included in that patent is the condensation product of an aldehyde rather than ketone of the 2-hydroxy phenyl reactant. Replacement of the carbonyl hydrogen by a methyl grouping results in an increase in the oxygen uptake induction period from 140 hours for the patented material to 251 hours for the methylated material under the conditions described in conjunction with Table I. In fact, addition of a second hydroxyl substituent ortho to the carbonyl results in a compound which while still effective as a metal deactivator shows only the expected lifetime of that of the patented compound. It is on the basis of change in activity with these very subtle chemical alterations that included compounds are so specifically described.

While compounds of the invention are unusually effective as metal deactivators and while they compare favorably with prior art materials as composite thermal antioxidant — metal deactivator (Table III herein), effectiveness as thermal antioxidants alone is not outstanding (Table II). From comparison of Tables I and III it is apparent that greater protection is afforded by inclusion both of a compound of the invention as metal deactivator and an additional thermal antioxidant. The hindered phenol used in the experiments set forth on Table I is

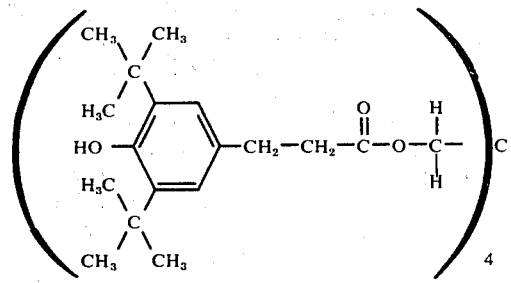

Antioxidants of somewhat greater effectiveness are described and claimed in copending application Ser. No. 500,957, filed Aug. 27, 1974. Either one, or another hindered phenol, may be utilized as a thermal antioxidant. Amino-type antioxidants while effective as thermal antioxidants may be used in conjunction with metal deactivators of the invention but are not in prevalent use in primary insulation because of discoloration during use — generally of concern where such insulation is color coded.

Contemplated use of the materials of the invention is as metal deactivatos in primary insulation in intimate contact with copper or other metals known to accelerate degradation. Content is properly expressed in terms of percent by weight of polymer composition. Inclusion is in the 0.01 percent to 5.0 percent range or preferably 0.05 to 0.5 percent (the same range in which contemplated thermal antioxidants are included). Lesser amounts do not afford appreciable protection to the polymer. Greater amounts are generally not usefully incorporated and may even be precluded by reduced solubility. Other ingredients are conventional. Colorants such as dyestuffs or pigments are also generally included in the range of below 0.5 percent by weight based on the polymer composition. Filler material such as silica may be included in some polymeric compositions. Under such circumstances stabilizer ranges set forth above are based on polymer exclusive of filler. Ordinarily, stabilizer tends to concentrate in amorphous regions in the polymer, the very regions most susceptible to attack by oxygen.

Other modifiers may serve a variety of well known functions. For deactiators small amounts of butyl rubber or butzdiene may be included to improve low temperature properties or impact resistance. Such modifiers may or may not be stabilized by stabilizers of the invention; and it is occasional practice to include stabilizers for these modifiers. Stabilization, in accordance with the invention, is concerned primarily with the saturated polymeric compounds and a given amount of stabilizer relative to such saturated polymer has a generally predictable stabilization effect on such compound regardless of other ingredients present.

2. Test Procedure

Compositions were synthesized by condensing one mole of oxalyl dihydrazide with two moles of the appropriate carbonyl compound in a solvent (e.g., ethenol or dimethyl sulfoxide). This is a conventional condensation reaction well understood by workers in the field. Appropriate conditions are evident from standard references such, for example, as J. March, *Advanced Organic Chemistry*, McGraw-Hill, New York, 1968.

Accelerated test procedures utilized to determine effectiveness have been in prevalent use for many years. They generally take the form of oxygen uptake measurement with the polymeric composition at some elevated temperature. For polyethylene compositions chosen as the subject of the examples, uptake measurements were conducted at 140° C. Test procedures are adequately described in the literature. See, for example, W. L. Hawkins, *Polymer Stabilization*, Wiley, New York, 1972, Chapter 10. Briefly, samples of measured volume are placed in a tube attached to a mercury manometer together with a measured quantity of absorbant material. Tube and associated apparatus are evacuated, flushed with, and finally filled with, oxygen and are brought to temperature in an appropriate furnace. Tube and contents are next connected to an oxygen gas burette; the system is adjusted to zero reading at atmospheric pressure, and readings of oxygen uptake are measured as a difference in column heights. Readings are taken at appropriate intervals, generally several hours apart.

The form of the resultant data is that of the conventional hindered phenol-stabilized system. This is characterized by an initial period known as the induction period in which oxygen uptake is extremely low. The induction period terminates with a sharp increase in slope of oxygen uptake vs. time.

Three forms of tests were conducted. In the first, effectiveness primarily as a metal deactivator was measured; in the second, effectiveness solely as a thermal antioxidant was evaluated; and in the third performance as a composite thermal antioxidant metal deactivator was evaluated. For comparison purposes, all tests were conducted on a commercial polyethylene composition.

Samples for the first series of tests were prepared by extruding unstabilized polyethylene with 0.1 percent by weight of the inventive stabilizer together with 0.1 percent of a hindered phenolic thermal stabilizer which is tetrakis-3-(3,5-di-t-butyl-4-hydroxyphenyl) propionatemethyl methane on 22 gauge copper wire. Insulation thickness in each instance was 6-7 mills. Gross sample weight was approximately 1 gram with about 0.108 gram being contributed by the insulation.

The second series of tests was performed on 0.1 gram, 10 mil thickness film samples of polyethylene, stabilized only by one of the inventive compounds.

In the third series of tests, precisely the same procedure was followed as in the first series except that the hindered phenolic thermal stabilizer was omitted.

The termination of the induction period was set at 1.0 milliliter of oxygen uptake for the 0.1 gram polymer sample. Choice of this particular level is meaningful from the standpoint of mechanical and electrical properties.

TABLE I — Effectiveness as Metal Deactivator

| Example | Conventional Antioxidant | Inventive Stabilizer | Oven Exposure at 70°C - Days | Induction Period at 140°C - Hours |
|---|---|---|---|---|
| 1 | (hindered phenol structure shown) | (bis-hydrazone structure shown) | 0 | 251 |
| 2 | | | 15 | 217 |
| 3 | | | 30 | 183 |
| 4 | | | 45 | 174 |
| 5 | | | 60 | 170 |
| 6 | | | 100 | 169 |
| Standard | | None | 0 | <5 |

TABLE II
Effectiveness as Thermal Antioxidant

| Examples | Inventive Stabilizer | Induction Period at 140 C - Hours |
|---|---|---|
| 7 | (hydrazone structure shown) | 46 |

TABLE III
Effectiveness as Composite Metal Deactivator - Thermal Antioxidant

| Example | Inventive Stabilizer | Induction Period at 140 C - Hours |
|---|---|---|
| 8 | 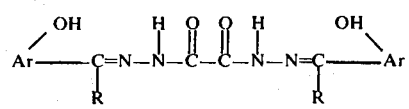 | 51 |
| Standard | NONE | 4.5 |

-continued

| Standard | NONE | 4.5 |

As a further comparison, Example 8 was rerun, however substituting the conventional antioxidant of Table I for the inventive stabilizer indicated. The induction period at 140° C was less than 5 hours.

3. Examples

Examples are set forth in tabular form with Tables I, II and III showing effectiveness as copper deactivator, as thermal antioxidant, and as composite metal deactivator—thermal antioxidant, respectively. Each Table includes a "standard" which corresponds with the same polymeric composition, however, without a stabilizer in accordance with the invention. Standards differ from Table to Table, as described in the preceding section. The standard of Table I is the polymer composition plus the selected prior art hindered phenolic antioxidant. The standards of Tables II and III, on the other hand, are unstabilized polymeric material.

Examples 1, 2, 3, 4, 5, and 6 (Table I) differ one from the other only with respect to sample thermal history prior to oxygen uptake testing. Samples corresponding to Examples 2–6 were first exposed to an oven temperature of 70° C for the number of days indicated. The trend shown—i.e., the reduction in expected life after such exposure—is not unusual. Indicated results considered applicable to all stabilizers of the invention indicate a relatively small stabilizer mobility at 70° C. The two types of accelerated data, i.e., first exposure at 70° C and second exposure at 140° C together, characterize the composition in terms found to serve as a reliable basis for expected life under usual operating conditions.

Example 7, Table II run with the same stabilizer as that of examples 1–6 suggests that stabilizers of the invention are somewhat effective as conventional thermal antioxidants. This preliminary data, while impressive, however, does not indicate an inductive period comparable to that resulting from use of the best prior art hindered phenols.

Referring to Table III, polyethylene containing only a stabilizer of the invention in a structure in which the polymer is in intimate contact with copper results in a reasonable protective period under the test conditions noted. For many purposes additional stabilizer will not be required. For long life applications it is likely that a prior art thermal antioxidant will be included.

What is claimed is:

1. Article including at least one metallic portion in intimate contact with a plastic portion, said metallic portion including at least one element which accelerates the oxidative degradation of at least a component of the said plastic portion, the said plastic portion including a polymeric composition which is at least 90 percent by weight nominally ethylenically saturated polymer, exclusive of filler, the said plastic portion containing a metal deactivator to lessen the acceleration of oxidation degradation due to the said metallic portion said metal deactivator being contained within the range of from 0.01 percent to 5.0 percent by weight based on the said polymeric composition; characterized in that the said metal deactivator is of the structure $$Ar\underset{R}{\overset{OH}{-C}}=N-N\overset{H}{\underset{}{-}}\overset{O}{\underset{}{C}}-\overset{O}{\underset{}{C}}-N\overset{H}{\underset{}{-}}N=\underset{R}{\overset{OH}{C}}-Ar$$

in which R is a methyl grouping or higher homologue alkyl grouping, in which Ar is a single aryl ring or fused aryl ring structure, in which the indicated hydroxy substituent is in a position ortho to the

grouping and is the only hydroxy substituent ortho to the said

grouping, in which there are permitted additional substituents on any ring position of the said Ar grouping other than that occupied by the said hydroxy grouping provided that such additional substituents do not include substituents which impair activity of hydroxy substituents.

2. Article of claim 1 in which the said metal deactivator is characterized in that said hydroxy substituent ortho to said

grouping is the only substituent on said Ar ring.

3. Article of claim 2 in which the said polymer may be produced by the polymerization of ethylene.

4. Article of claim 1 in which the said metallic portion comprises copper.

5. Article of claim 1 in which the said plastic portion contains a thermal antioxidant in addition to the metal deactivator.

6. Article of claim 5 in which the said thermal antioxidant is a hindered phenol.

7. Article of claim 1 in which the said metal deactivator is of the structure

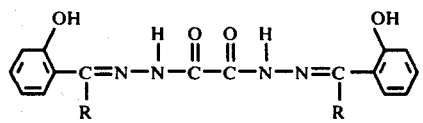

in which R is a methyl grouping or higher homologue alkyl grouping.

* * * * *

UNITED STATES PATENT AND TRADEMARK OFFICE
CERTIFICATE OF CORRECTION

PATENT NO. : 3,970,637
DATED : July 20, 1976
INVENTOR(S) : Ray L. Hartless and Anthony Marion Trozzolo It is certified that error appears in the above-identified patent and that said Letters Patent are hereby corrected as shown below:

Column 2, line 19, "dibenze" should read --dibenzal--.

Column 4, line 58, "deactivatos" should read --deactivators--.

Column 5, line 11, "deactiators" should read --example--.

Signed and Sealed this

Twenty-fifth Day of January 1977

[SEAL]

Attest:

RUTH C. MASON
Attesting Officer

C. MARSHALL DANN
Commissioner of Patents and Trademarks